United States Patent [19]

Fujiwara et al.

[11] Patent Number: 4,978,409

[45] Date of Patent: Dec. 18, 1990

[54] METHOD OF BONDING FIBERS TO HYDROGENATED NITRILE RUBBER

[75] Inventors: Akinori Fujiwara; Hiroshi Matsuoka; Susumu Onoe; Kenji Kusaka, all of Kobe, Japan

[73] Assignee: Bando Chemical Industries, Ltd., Kobe, Japan

[21] Appl. No.: 373,062

[22] Filed: Jun. 29, 1989

[30] Foreign Application Priority Data

Jul. 6, 1988 [JP] Japan .................................. 63-169883
Jul. 6, 1988 [JP] Japan .................................. 63-169884
Jul. 6, 1988 [JP] Japan .................................. 63-169885

[51] Int. Cl.$^5$ .......................... C09J 5/04; D02G 3/48; B05D 5/10
[52] U.S. Cl. ..................... 156/315; 156/910; 152/565; 428/378
[58] Field of Search ............... 152/565; 156/910, 315; 428/252, 520, 378, 522; 427/175, 434.6; 57/902

[56] References Cited

U.S. PATENT DOCUMENTS 3,278,333 10/1966 Titzmann et al. ............... 156/910
4,448,813 5/1984 Solomon .......................... 427/381
4,751,143 6/1988 Gibbon et al. ..................... 428/395

FOREIGN PATENT DOCUMENTS 1097880 1/1968 United Kingdom .

Primary Examiner—Michael W. Ball
Assistant Examiner—Adrienne C. Johnstone
Attorney, Agent, or Firm—Wegner, Cantor, Mueller & Player

[57] ABSTRACT

A method of bonding fibers to hydrogenated nitrile rubber which comprises:

the first step of treating fibers with an activating agent selected from the group consisting of polyisocyanates, epoxy compounds and silane coupling agents;

the second step of dipping the fibers into a resorcinol/-formalin/latex solution;

the third step of treating the fibers with an adhesive composition which comprises (a) 1–90% by weight of polymers, based on the composition, the polymers containing halogens in amounts of 25–70% by weight based on the polymers, and (b) 10–99% by weight of polyisocyanates, aromatic polynitroso compounds or polyepoxy compounds; and the fourth step of placing the fibers in close contact with hydrogenated nitrile rubber and vulcanizing the rubber together with the fibers.

The resultant composites have large strength and high resistance to fatigue from repeated flexure.

8 Claims, 6 Drawing Sheets

METHOD OF BONDING FIBERS TO HYDROGENATED NITRILE RUBBER

This invention relates to a method of bonding fibers to hydrogenated nitrile rubber.

Hydrogenated nitrile rubber is produced by hydrogenation of double bonds contained in nitrile rubber. Thus, in the hydrogenated nitrile rubber, recombination of sulfur to thermal age and deterioration in elasticity based thereon are prevented, and the hydrogenated nitrile rubber is improved in heat resistance while maintaining excellent oil resistance which the nitrile rubber originally possesses. Thus, the hydrogenated nitrile rubber is now widely used on account of its excellent heat and oil resistance.

Meanwhile, a variety of methods of bonding fibers to rubber are known, among which there is a well known method wherein fibers are treated with so-called RFL solutions, namely aqueous mixtures of resorcinol, formalin and rubber latices, and placed in contact with compounded rubber mixes, and then the rubber mixes are vulcanized together with the fibers.

With regard to adhesion of fibers to hydrogenated nitrile rubber in particular, a method is already known in which fibers are treated with RFL solutions composed of resorcinol, formalin and carboxylated acrylonitrile/butadiene rubber latices, as is disclosed in Japanese Patent Laid-open No. 58-45940. A further method is also disclosed in Japanese Patent Laid-open No. 61-207442 wherein RFL solutions are used which are composed of a halogen-containing polymer latices, resorcinol and formalin.

Fibers are bonded to hydrogenated nitrile rubber to a degree by treating the fibers in advance with RFL solutions, as set forth above, however, the resulting adhesion does not stand uses where large shearing force is generated between the rubber and fibers by, for example, compression or elongation.

There is also known a method which includes treatment of fibers with polyisocyanate, epoxy compounds or aromatic nitroso compounds. For instance, in Japanese Patent Laid-open No. 62-133187 is disclosed a method in which carbon fibers are treated with an adhesive composition containing chlorosulfonated polyethylene rubber and polyisocyanate compounds, and then bonded to hydrogenated nitrile rubber under vulcanizing conditions. In Japanese Patent Publication No. 51-274, there is disclosed a method in which fibers are first treated with 2,3-dihalo-1,3-butadiene polymers and aromatic polynitroso compounds, and then bonded to rubber mixes. A further method is disclosed in Japanese Patent Publication No. 49-14546 which includes the treatment of fibers with adhesive compositions containing chlorosulfonated polyethylene rubber, polyisocyanates and p-dinitrosobenzene.

However, when these methods are employed to bond fiber cords to hydrogenated nitrile rubber, for instance, the methods have a disadvantage that the adhesive composition permeates into the cords to harden them, so that the cords lose their flexibility to a great extent.

It is, therefore, an object of the invention to obviate the problems involved in the prior art adhesion of fibers to hydrogenated nitrile rubber, and to provide a method of attaining strong adhesion between fibers and hydrogenated nitrile rubber which stands uses where large shearing force is generated therebetween.

It is a particular object of the invention to provide a method of bonding fiber cords to hydrogenated nitrile rubber which retains large tensile strength and high resistance to fatigue from repeated flexure over a long period use.

The method of bonding fibers to hydrogenated nitrile rubber in accordance with the invention comprises:

the first step of treating fibers with an activating agent selected from the group consisting of polyisocyanates, epoxy compounds and silane coupling agents;

the second step of dipping the fibers into a resorcinol/formalin/latex solution;

the third step of treating the fibers with an adhesive composition which comprises (a) 1–90% by weight of polymers, based on the composition, the polymers containing halogens in amounts of 25–70% by weight based on the polymers, and (b) 10–99% by weight of polyisocyanates, aromatic polynitroso compounds or polyepoxy compounds; and the fourth step of placing the fibers in close contact with hydrogenated nitrile rubber and vulcanizing the rubber together with the fibers.

In the first step, the fibers are treated with an activating agent selected from the group consisting of polyisocyanates, epoxy compounds and silane coupling agents, to activate the fibers.

The polyisocyanates used are not specifically limited, but preferred examples include tolylenediisocyanate, m-phenylenediisocyanate, diphenylmethane diisocyanate, hexamethylenediisocyanate and polymethylene polyphenyl polyisocyanate. The polyisocyanates may be in the form of adducts with compounds which have not less than two active hydrogens in the molecule such as polyhydric alcohols exemplified by trimethylolpropane or pentaerythritol, or in the form of blocked polyisocyanates which are obtained by the reaction of the polyisocyanates with blocking agents such as phenols, tertiary alcohols or secondary amines.

The polyepoxy compounds used include, for example, reaction products of polyhydric compounds with halogen containing epoxide compounds such as epichlorohydrin. There may be mentioned as such polyhydric compounds, for example, polyhydric alcohols such as ethylene glycol, glycerine, sorbitol or pentaerythritol; polyalkylene glycols such as polyethylene glycol or polypropylene glycol; or polyfunctional phenols such as resorcinol or bis(4-hydroxyphenyl)dimethylethane; or phenol resins such as phenol/formalin resins or resorcinol/formalin resins.

The silane coupling agents preferably used include vinyltrialkoxysilanes, aminoalkyltrialkoxysilanes, acryloxyalkyltrialkoxysilanes and methacryloxyalkyltrialkoxysilanes. There may be mentioned as such silane coupling agents, for instance, vinyltrichlorosilane, vinyltrimethoxysilane, vinyltriethoxysilane, vinyltris($\beta$- methoxyethoxy)silane, γ-methacryloxypropyltrimethoxysilane, γ-methacryloxypropyltris(β-methoxy)silane, γ-aminopropyltriethoxysilane or vinyltriacetoxysilane.

The activating agent is usually used in the form of solutions. The fibers are dipped into the solutions, and then dried, preferably under heating, for example, at temperatures of about 100°–250° C. so that the activating agent reacts with and is fixed on the fibers.

In the second step, the thus activated fibers are treated with resorcinol/formalin/latex solutions. As set forth previously, the fibers are activated by the treatment with the activating agent in the previous step, so that the resorcinol/formalin/latex solutions adhere strongly to the fibers in this step, and in the end, a strong adhesion is attained between the fibers and hydrogenated nitrile rubber.

The resorcinol/formalin/latex solutions preferably contain resorcinol and formalin in molar ratios of 1/3–3/1, and the latices and resorcinol/formalin in ratios of latices as solids to resorcinol/formalin in dry weights of 10/1–1/3.

The latices used include, for instance, acrylonitrile/butadiene rubber (NBR) latices, carboxylated acrylonitrile/butadiene rubber (NBR) latices, styrene/butadiene rubber (SBR) latices, vinylpyridine rubber (VP) latices, chloroprene rubber (CR) latices and chlorosulfonated polyethylene rubber (CSM) latices.

In the second step, the fibers are usually dipped into the resorcinol/formalin/latex solutions and then dried, preferably under heating at temperatures, for instance, of about 100°–250° C. for several minutes to fix the solutions on the fibers.

The treatment of the fibers with the resorcinol/formalin/latex solutions in the second step improves wettability of adhesive compositions to the fibers, as will be described in the next third step, but also prevents the adhesive compositions from permeating into fiber cords when the fiber cords are bonded to hydrogenated nitrile rubber, thereby to attain an effective adhesion therebetween with use of small amounts of the adhesive compositions. Further, the prevention of the adhesive compositions from permeating into fiber cords keeps the fiber cords flexible as they originally are, thereby to provide adherends of the fiber cords and the rubber of a high resistance to fatigue when repeatedly flexed.

Then, in the third step, the fibers are treated with an adhesive composition. The composition comprises (a) 1–90% by weight of organic polymers and (b) 10–99% by weight of polyisocyanates, aromatic polynitroso compounds or polyepoxy compounds. The organic polymers contain halogens, preferably chlorine, therein in amounts of 25–70%, preferably 25–60% by weight based on the polymer, and may be exemplified by chlorinated rubber, polyvinyl chloride, chloroprene rubber or chlorosulfonated polyethylene rubber. When the polymers used contain halogens in amounts other than the above specified, the resultant adherends have very weak adhesion between the fibers and hydrogenated nitrile rubber.

The polyisocyanates in the adhesive compositions may be the same as described hereinbefore, and may also be in the form of adducts or blocked polyisocyanates.

The aromatic polynitroso compounds used in the adhesive compositions are aromatic compounds which have not less than two nitroso groups in the molecule, and may be exemplified by poly-p-dinitrosobenzene and polydinitrosonaphthalene. The polyepoxy compounds used in the adhesive compositions also may be the same as hereinbefore described.

The adhesive compositions are preferably used in the form of solutions in organic solvents such as aromatic hydrocarbons including benzene, toluene or xylene, or ethers, or halogenated aliphatic hydrocarbons such as trichloroethylene. The fibers are usually dipped into the solutions of the adhesive compositions and then dried, preferably under heating at temperatures usually of not more than about 250° C., although depending upon the fibers used, so that the adhesive compositions are fixed on the fibers.

In the treatment of the fibers with the adhesive compositions in the third step, since the adhesive compositions contain organic polymers which contain high polarity halogen groups therein, the adhesive compositions have a high miscibility with the latices, and further, the adhesive compositions are strongly adsorbed on the fibers, but also they have high miscibility with hydrogenated nitrile rubber. Moreover, the adhesive compositions are crosslinked to rubber latices and hydrogenated nitrile rubber by vulcanizing agents or, the polyisocyanates, aromatic polynitroso compounds or polyepoxy compounds contained in the adhesive compositions, in the next fourth vulcanizing step. It is likely that, based on these reasons, a strong adhesion is formed between the fibers and the hydrogenated nitrile rubber according to the invention.

The adhesive compositions may further contain additives such as carbon black, fillers, softening agents or antioxidants, which are usually incorporated into compounded hydrogenated nitrile rubber mixes. Also the hydrogenated nitrile rubber mix may contain reinforcing fillers, antioxidants, plasticizers, vulcanizing assistants or processing assistants. Further, the fibers may be treated with rubber cement containing compounded hydrogenated nitrile rubber mixes.

The hydrogenated nitrile rubber used in the invention has a hydrogenation rate preferably of 80–99%. The method of the invention is applicable to any fibers, but preferred fibers are, for example, cotton, rayon, polyvinyl alcohol fibers, aliphatic polyamide fibers, aromatic polyamide fibers, polyester fibers, glass fibers and carbon fibers.

The fibers are finally placed in close contact with compounded hydrogenated nitrile rubber mixes in the fourth step, and the rubber mixes are vulcanized together with the fibers in conventional manners.

As set forth above, the fibers are treated with activating agents to activate the fibers, then with resorcinol/formalin/latex solutions, and then with adhesive compositions which have high miscibility with both hydrogenated nitrile rubber and rubber latices, in accordance with the invention, so that a strong adhesion is formed between the fibers and the rubber. In particular, when fiber cords are bonded to hydrogenated nitrile rubber according to the invention, the fibers are treated with the adhesive composition after being treated with resorcinol/formalin/latex solutions, so that there takes place no significant permeation of the adhesive compositions into the cords, and as results, composite adherends which have large strength and high resistance to fatigue from repeated flexure are obtained.

Therefore, the method of the invention is suitably applicable to adhesion of reinforcing fibers to hydrogenated nitrile rubber in the production of dynamic fiber-rubber composites such as power transmission belts, conveyor belts and automobile tires.

The invention will now be described with reference to examples, however, the invention is not limited to the examples. In the examples, parts and percents are by weight unless otherwise specified.

EXAMPLE 1

Aromatic polyamide fiber cords ("Kevlar" (tradename) by Du pont, 1500D/2×3) were dipped into a 5% aqueous solution of water soluble epoxy resin (Denacol EX 313 by Nagase Sangyo K. K., glycerine polyglycidyl ether), the solution being referred to as Solution A hereinafter, and then dried at 200° C. for two minutes.

The cords were then dipped into a resorcinol/formalin/latex solution composed of 5.0 parts of resorcinol, 3.1 parts of a 37% formalin solution, 61.6 parts of an NBR latex (Nipol 1562 by Nippon Zeon K. K.) of resorcinol/formalin molar ratio of 1.2/1 and 84.3 parts of water, the latex solution being referred to as Solution H hereinafter, and then dried at 200° C. for two minutes.

The cords were then dipped into adhesive compositions W, X and Y, respectively, all of which contained chlorine containing polymers, as their formulations are shown in the Table 1, and dried at 110° C. for two minutes (Runs Invention No. 1-3).

For comparison, the fibers were treated with an adhesive composition Z which contained no halogen containing polymers, as shown in the Table 1, and otherwise in the same manner as above described (Runs Comparison No. 1).

Further for comparison, the fibers were first treated with the Solution A, and then treated with the adhesive compositions W, X, Y and Z, respectively, without the treatment with the Solution H (Runs Comparison No. 3-6).

TABLE 1

| Ingredients of Adhesives | Adhesive Compositions (%) | | | |
|---|---|---|---|---|
| | W | X | Y | Z |
| Chlorinated rubber[1] | 10 | — | — | — |
| Chloroprene rubber[2] | — | 10 | — | — |
| Chlorosulfonated polyethylene rubber[3] | — | — | 10 | — |
| Nitrile rubber[4] | — | — | — | 10 |
| Polymethylenepolyphenyl polyisocyanate | 10 | 10 | 10 | 10 |
| Carbon black | 5 | 5 | 5 | 5 |
| Toluene | 75 | 75 | 75 | 75 |

Notes:
[1]CR-50, chlorine content 58%, Asahi Denka K.K.
[2]M-40, chlorine content 40%, Denki Kagaku K.K.
[3]CSM-20, chlorine content 29%, Du pont.
[4]Chlorine content 0%, Nippon Zeon K.K.

The fiber cords were then placed at intervals of 3 mm on a sheet of a compounded mix composed of 100 parts of hydrogenated nitrile rubber (Zetpol 2020, hydrogenation rate of 90%, by Nippon Zeon K. K.), 5 parts of zinc oxide (JIS No. 1 Grade), 1 part of stearic acid, 0.5 parts of sulfur, 40 parts of SFR carbon, 2 parts of tetramethylthiuram disulfide and 0.5 parts of mercaptobenzothiazol, and the sheet was vulcanized together with the cords at 160° C. for 20 minutes.

Figure 1:
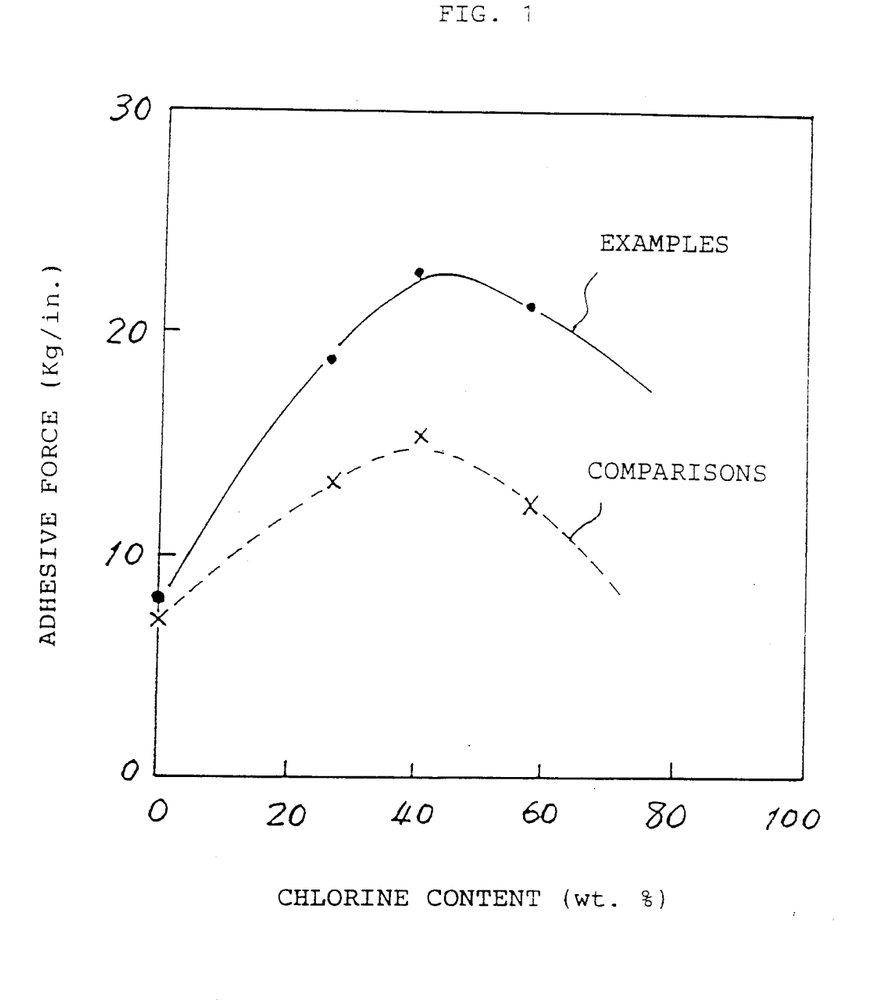
FIGS. 1, 3 and 5 are graphs which show the relation between the chlorine content of polymers in the adhesive compositions used and adhesive force attained in the resultant adherends of hydrogenated nitrile rubber and aromatic polyamide fiber cords.

After the vulcanization, the resultant adherends were cut into specimens of one inch in width, and peeling adhesive force was measured at a peeling angle of 90° and a peeling rate of 50 mm per minute. The results are shown in the Table 2 and in FIG. 1 which illustrates the relation between the chlorine contents of the polymers in the adhesive compositions and the peeling adhesive forces in the resultant adherends.

TABLE 2

| | Invention | | | Comparison | |
|---|---|---|---|---|---|
| | 1 | 2 | 3 | 1 | 2 |
| Solution in 1st step | A | A | A | A | A |
| Solution in 2nd step | H | H | H | H | H |
| Adhesive in 3rd step | W | X | Y | Z | — |
| Adhesive force (Kg/in.) | 21.6 | 22.8 | 19.4 | 8.6 | 5.8 |
| Strength (Kg/cord) | | | | | |
| Before flexing | 164 | 167 | 168 | 170 | 171 |
| After flexing | 130 | 142 | 150 | 148 | 157 |
| Strength retention (%) | 79 | 85 | 89 | 87 | 92 |

| | Comparison | | | |
|---|---|---|---|---|
| | 3 | 4 | 5 | 6 |
| Solution in 1st step | A | A | A | A |
| Solution in 2nd step | — | — | — | — |
| Adhesive in 3rd step | W | X | Y | Z |
| Adhesive force (Kg/in.) | 12.1 | 15.4 | 13.2 | 8.1 |
| Strength (Kg/cord) | | | | |
| Before flexing | 150 | 152 | 155 | 154 |
| After flexing | cut | cut | 23 | 31 |
| Strength retention (%) | 0 | 0 | 15 | 20 |

EXAMPLE 2

The same sheet of the compounded mix of the hydrogenated nitrile rubber of 1.0 mm thick as in the Example 1 was rolled on a drum, and thereon the fiber cords which had been treated in the Example 1 were spun. Then, the same sheet of the rubber mix was further rolled on the fiber cords.

The layered sheets of the rubber mixes were then steam vulcanized under 6 kg/cm² for 35 minutes, to provide layered sheets bonded together and having two fiber cords therebetween extending parallel to each other longitudinally of the sheets.

The specimen was fixed at its one end to a frame, and then travelled along a pair of rotational bars, with the other end connected to a load of 1.5 kg. Then the bars were moved up and down in the opposite directions 100,000 times while rotating in such a manner that the distance between the rotational axes of the bars oscillatorily changed, thereby to estimate the tensile strength retention which is defined by tensile strength after the flexing test divided tensile strength before the test. The results are shown in the Table 2.

EXAMPLE 3

The same fiber cords as in the Example 1 were treated with adhesive compositions containing halogen containing polymers and polyisocyanates in varied ratios, and otherwise in the same manner as in the Run Invention No. 1 in the Example 1. Then, the cords were bonded to the same rubber mix sheets as in the Examples 1 and 2, to provide adherends. The same measurements as in the Examples 1 and 2 were carried out.

Figure 2:
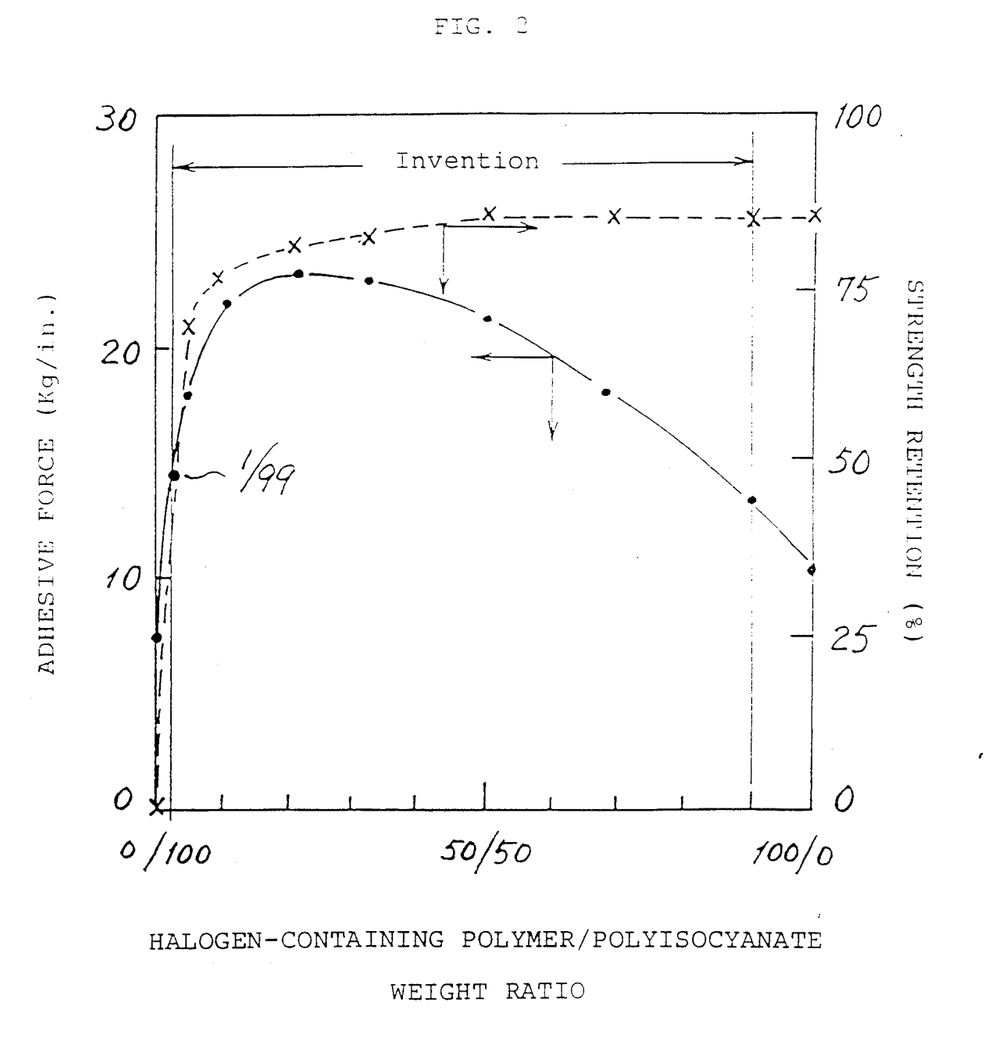
FIGS. 2, 4 and 6 are graphs which show the relation between the weight ratio of chlorine-containing polymers to polyisocyanates, aromatic polynitroso compounds and polyepoxy compounds, respectively, all as ingredients in the adhesive compositions used, and adhesive force and strength retention of the resultant adherends of hydrogenated nitrile rubber and aromatic polyamide fiber cords.

The results are shown in FIG. 2, which shows the relation between the weight ratio of chlorine-containing polymers to polyisocyanates in the adhesive compositions used, and adhesive force and strength retention of the resultant adherends of hydrogenated nitrile rubber and aromatic polyamide fiber cords.

EXAMPLE 4

The same fiber cords as in the Example 1 were treated with resorcinol/formalin/latex solutions I, J and K, respectively, shown in the Table 3, in place of the Solution H, and otherwise in the same manner as in the Run Invention No. 1 in the Example 1. Then, the cords were bonded to the same rubber mix as in the Examples 1 and 2, to provide adherends. The same measurements as in the Examples 1 and 2 were carried out. The results are shown in the Table 4.

TABLE 3

| Ingredients of | RFL Solutions | | |
|---|---|---|---|
| RFL Solutions | I | J | K |
| Resorcinol | 5.0 | 5.0 | 5.0 |
| Formalin (37%) | 3.1 | 3.1 | 3.1 |
| SBR latex[1] | 61.6 | — | — |
| VP patex[2] | — | 61.6 | — |
| CR latex[3] | — | — | 61.6 |
| Water | 84.3 | 84.3 | 84.3 |

Notes:
[1] Nippon Zeon K.K.
[2] Nippon Gosei Rubber K.K.
[3] Denki Kagaku K.K.

TABLE 4

| | Example 4 Invention | | | Example 5 Invention | |
|---|---|---|---|---|---|
| | 4 | 5 | 6 | 7 | 8 |
| Solution in 1st step | A | A | A | B | C |
| Solution in 2nd step | I | J | K | H | H |
| Adhesive in 3rd step | W | W | W | W | W |
| Adhesive force (Kg/in.) | 21.7 | 20.4 | 25.3 | 20.3 | 18.2 |
| Strength retention (%) | 81 | 76 | 83 | 97 | 98 |

EXAMPLE 5

A Solution B was prepared which was composed of 5 parts of 4,4'-diphenylmethane diisocyanate blocked with phenol and 95 parts of water, and a Solution C composed of 5 parts of α-aminopropyltriethoxysilane and 95 parts of water.

The same fiber cords as in the Example 1 were treated with the Solutions B and C, respectively, and otherwise in the same manner as in the Run Invention No. 1 in the Example 1. Then, the cords were bonded to the same rubber mix as in the Examples 1 and 2, to provide adherends. The same measurements as in the Examples 1 and 2 were carried out. The results are shown in the Table 4.

EXAMPLE 6

The fiber cords shown in the Table 5 were used in place of the aromatic polyamide fiber cords, and otherwise in the same manner as in the Run Invention No. 1 in the Example 1, the cords were bonded to the same sheet of the hydrogenated nitrile rubber mix as in the Examples 1 and 2.

The same measurements as in the Examples 1 and 2 were carried out. The results are shown in the Table 5.

TABLE 5

| | Invention | | |
|---|---|---|---|
| | 9 | 10 | 11 |
| Fiber cords[1] | a | b | c |
| Structures | 1200D/ 2 × 3 | 1260D/ 2 × 3 | 1100D/ 2 × 3 |
| Adhesive force (Kg/in.) | 22.3 | 21.4 | 20.4 |
| Strength retention (%) | 98 | 99 | 84 |

Notes:
a: of polyvinyl alcohol;
b: of aliphatic polyamide;
c: of polyester

EXAMPLE 7

The same aromatic polyamide fiber cords as in the Example 1 were treated with the same aqueous solution of epoxy resin (Solution A) and the same resorcinol/formalin/latex solution (Solution H) in the same manner as in the Example 1.

The cords were then dipped into adhesive compositions W, X and Y, respectively, all of which contained chlorine containing polymers, as their formulations are shown in the Table 6, and dried at 110° C. for two minutes (Runs Invention No. 1-3).

For comparison, the fiber cords were treated with an adhesive composition Z which contained no halogen containing polymers, as shown in the Table 6, and otherwise in the same manner as above described (Runs Comparison No. 1).

TABLE 6

| | Adhesive Compositions (%) | | | |
|---|---|---|---|---|
| Ingredients of Adhesives | W | X | Y | Z |
| Chlorinated rubber [1] | 10 | — | — | — |
| Chloroprene rubber[2] | — | 10 | — | — |
| Chlorosulfonated polyethylene rubber[3] | — | — | 10 | — |
| Nitrile rubber[4] | — | — | — | 10 |
| Poly-p-nitrosobenzene[5] | 10 | 10 | 10 | 10 |
| Carbon black | 5 | 5 | 5 | 5 |
| Toluene | 75 | 75 | 75 | 75 |

Notes:
[1] CR-50, chlorine content 58%, Asahi Denka K.K.
[2] M-40, chlorine content 40%, Denki Kagaku K.K.
[3] CSM-20, chlorine content 29%, Du pont.
[4] Chlorine content 0%, Nippon Zeon K.K.
[5] Valnock DNB, Ohuchi Shinko Kagaku K.K.

Further for comparison, the fibers were first treated with the Solution A, and then treated with the adhesive compositions W, X, Y and Z, respectively, without the treatment with the Solution H (Runs Comparison No. 3-6).

Figure 3:
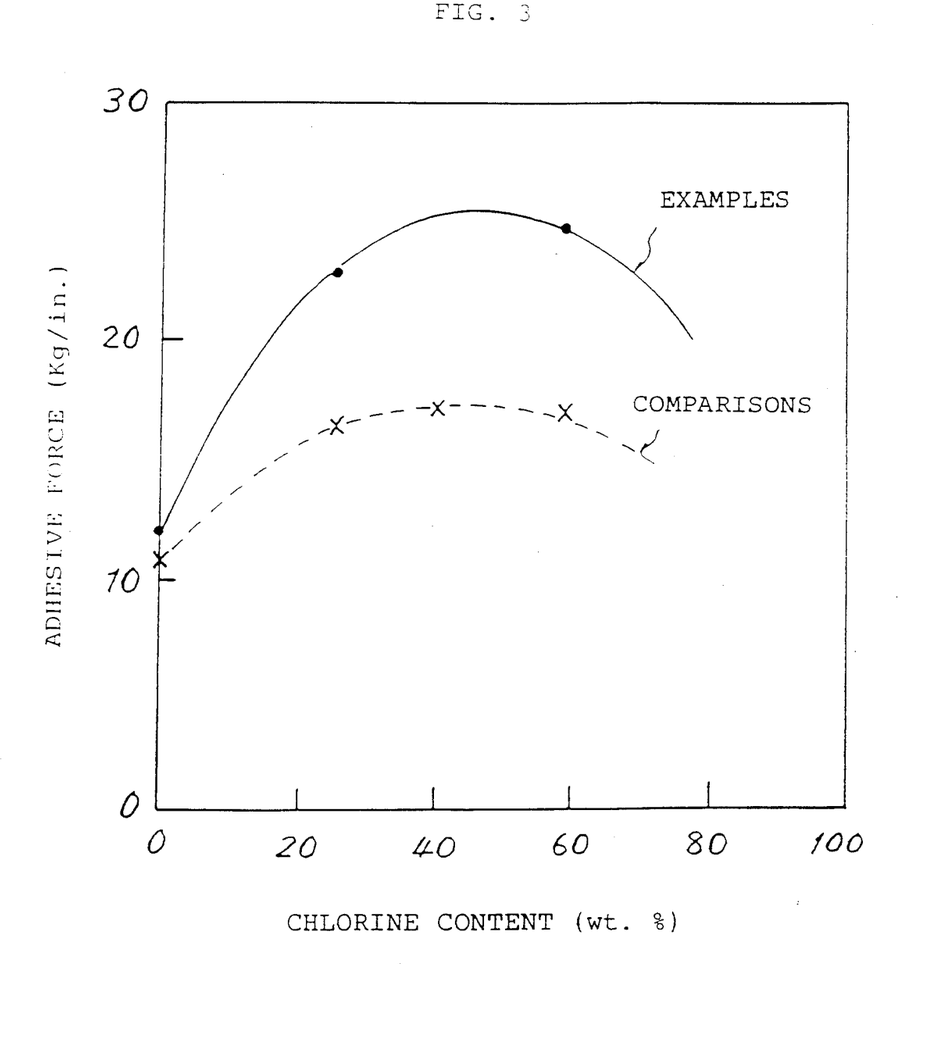

The fiber cords were then bonded to the same rubber mix as in the Example 1, and peeling adhesive force was measured in the same manner as in the Example 1. The results are shown in the Table 7 and in FIG. 3 which illustrates the relation between the chlorine content of the polymers in the adhesive compositions and the peeling adhesive force.

TABLE 7

| | Invention | | | Comparison | |
|---|---|---|---|---|---|
| | 1 | 2 | 3 | 1 | 2 |
| Solution in 1st step | A | A | A | A | A |
| Solution in 2nd step | H | H | H | H | H |
| Adhesive in 3rd step | W | X | Y | Z | — |
| Adhesive force (Kg/in.) | 24.6 | 25.8 | 24.4 | 12.6 | 9.8 |
| Strength (Kg/cord) | | | | | |
| Before flexing | 154 | 157 | 158 | 157 | 161 |
| After flexing | 120 | 132 | 140 | 138 | 147 |
| Strength retention (%) | 78 | 84 | 89 | 88 | 91 |

| | Comparison | | | |
|---|---|---|---|---|
| | 3 | 4 | 5 | 6 |
| Solution in 1st step | A | A | A | A |
| Solution in 2nd step | — | — | — | — |
| Adhesive in 3rd step | W | X | Y | Z |
| Adhesive force (Kg/in.) | 17.1 | 17.9 | 17.8 | 11.1 |
| Strength (kg/cord) | | | | |
| Before flexing | 140 | 142 | 145 | 144 |
| After flexing | cut | cut | 13 | 21 |
| Strength retention (%) | 0 | 0 | 9 | 15 |

EXAMPLE 8

The same sheet of the rubber mix as in the Example 1 was rolled on a drum, and thereon the fiber cords which had been treated in the Example 7 were spun. Then, the same sheet of the rubber mix as above was further rolled on the fiber cords.

The layered sheets of the rubber mixes were then steam vulcanized in the same manner as in the Example 2. The resultant layered sheets bonded together and having fiber cords embedded therebetween were subjected to the same flexing test as in the Example 2. The results are shown in the Table 7.

EXAMPLE 9

The same fiber cords as in the Example 1 were treated with adhesive compositions containing halogen containing polymers and aromatic polynitroso compounds in varied ratios, and otherwise in the same manner as in the Run Invention No. 1 in the Example 7. Then, the cords were bonded to the same rubber mix as in the Examples 1 and 2, to provide adherends. The same measurements as in the Examples 1 and 2 were carried out.

Figure 4:
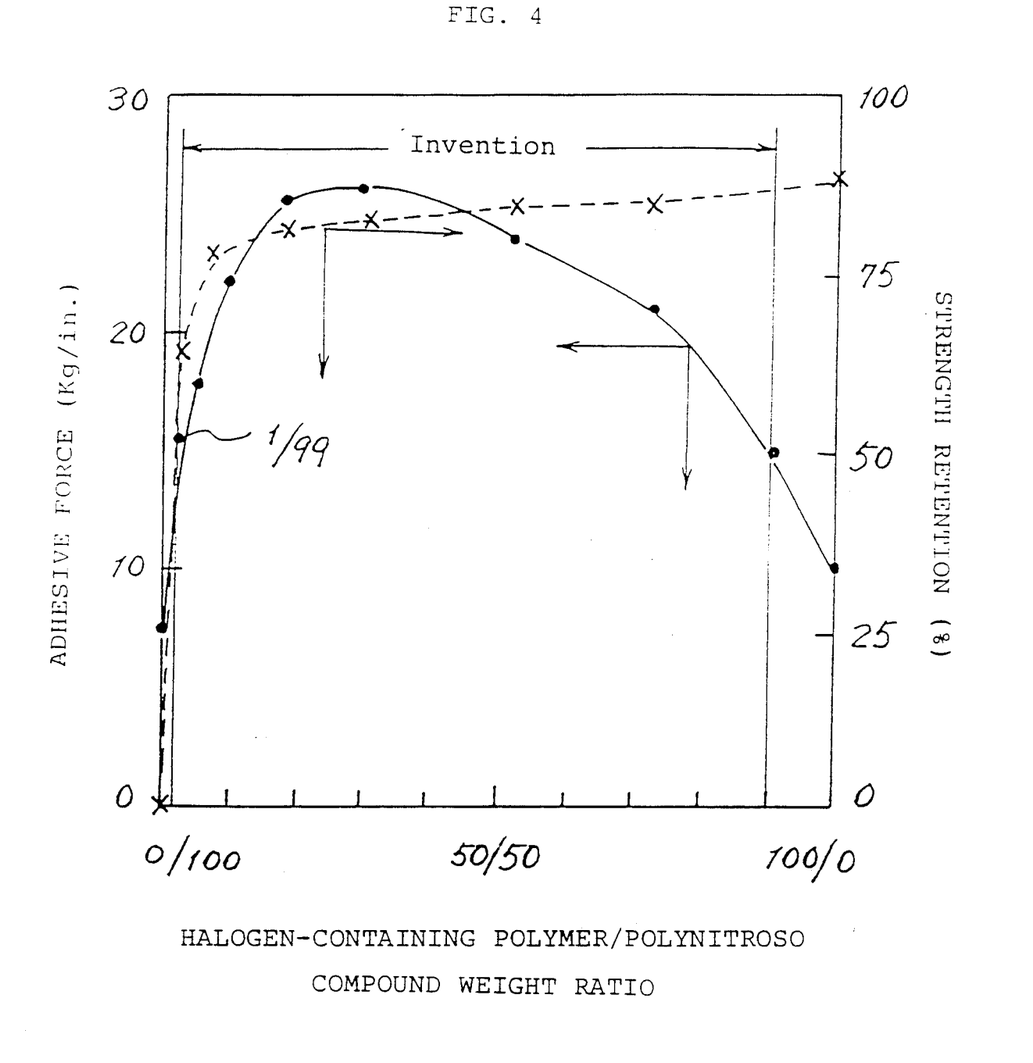

The results are shown in FIG. 4, which shows the relation between the weight ratio of chlorine-containing polymers to aromatic polynitroso compounds in the adhesive compositions used, and adhesive force and strength retention of the resultant adherends of hydrogenated nitrile rubber and aromatic polyamide fiber cords.

EXAMPLE 10

The same fiber cords as in the Examples 1 were treated with resorcinol/formalin/latex solutions I, J and K, respectively, shown in the Table 3, in place of the Solution A, and otherwise in the same manner as in the Run Invention No. 1 in the Example 7. Then, the cords were bonded to the same rubber mix as in the Examples 1 and 2, to provide adherends. The same measurements as in the Examples 1 and 2 were carried out. The results are shown in the Table 8.

TABLE 8

|  | Example 10 Invention | | | Example 11 Invention | |
|---|---|---|---|---|---|
|  | 4 | 5 | 6 | 7 | 8 |
| Solution in 1st step | A | A | A | B | C |
| Solution in 2nd step | I | J | K | H | H |
| Adhesive in 3rd step | W | W | W | W | W |
| Adhesive force (Kg/inch) | 24.7 | 23.4 | 28.3 | 23.3 | 21.2 |
| Strength retention (%) | 82 | 75 | 83 | 97 | 97 |

EXAMPLE 11

The same fiber cords as in the Example 1 were treated with the Solutions B and C, respectively, and otherwise in the same manner as in the Run Invention No. 1 in the Example 7. Then, the cords were bonded to the same rubber mix as in the Examples 1 and 2, to provide adherends. The same measurements as in the Examples 1 and 2 were carried out. The results are shown in the Table 8.

EXAMPLE 12

The fiber cords shown in the Table 9 were used in place of the aromatic polyamide fiber cords, and otherwise in the same manner as in the Run Invention No. 1 in the Example 7, the cords were bonded to the same sheet of the hydrogenated nitrile rubber mix as in the Examples 1 and 2.

The same measurements as in the Examples 1 and 2 were carried out. The results are shown in the Table 9.

TABLE 9

|  | Invention | | |
|---|---|---|---|
|  | 9 | 10 | 11 |
| Fiber cords[1] | a | b | c |
| Structures | 1200D/ 2 × 3 | 1260D/ 2 × 3 | 1100D/ 2 × 3 |
| Adhesive force (Kg/inch) | 23.3 | 23.4 | 22.1 |
| Strength retention (%) | 97 | 98 | 83 |

Notes:
a: of polyvinyl alcohol;
b: of aliphatic polyamide;
c: of polyester

EXAMPLE 13

The same aromatic polyamide fiber cords as in the Example 1 were treated with the same aqueous solution of epoxy resin (Solution A) and the same resorcinol/formalin/latex solution (Solution H) in the same manner as in the Example 1.

The cords were then dipped into adhesive compositions W, X and Y, respectively, all of which contained chlorine containing polymers, as their formulations are shown in the Table 10, and dried at 110° C. for two minutes (Runs Invention No. 1-3).

For comparison, the fibers were treated with an adhesive composition Z which contained no halogen containing polymers, as shown in the Table 10, and otherwise in the same manner as above described (Runs Comparison No. 1).

Further for comparison, the fibers were first treated with the Solution A, and then treated with the adhesive compositions W, X, Y and Z, respectively, without the treatment with the Solution H (Runs Comparison No. 3-6).

TABLE 10

| Ingredients of Adhesive | Adhesive Compositions (%) | | | |
|---|---|---|---|---|
|  | W | X | Y | Z |
| Chlorinate rubber[1] | 10 | — | — | — |
| Chloroprene rubber[2] | — | 10 | — | — |
| Chlorosulfonated polyethylene rubber[3] | — | — | 10 | — |
| Nitrile rubber[4] | — | — | — | 10 |
| Glycerine polyglycidyl ether[5] | 10 | 10 | 10 | 10 |
| Carbon black | 5 | 5 | 5 | 5 |
| Toluene | 75 | 75 | 75 | 75 |

Notes:
[1]CR-50, chlorine content 58%, Asahi Denka K.K.
[2]M-40, chlorine content 40%, Denki Kagaku K.K.
[3]CSM-20, chlorine content 29%, Du pont.
[4]Chlorine content 0%, Nippon Zeon K.K.
[5]Denacol EX 313, Nagase Sangyo K.K.

Figure 5:
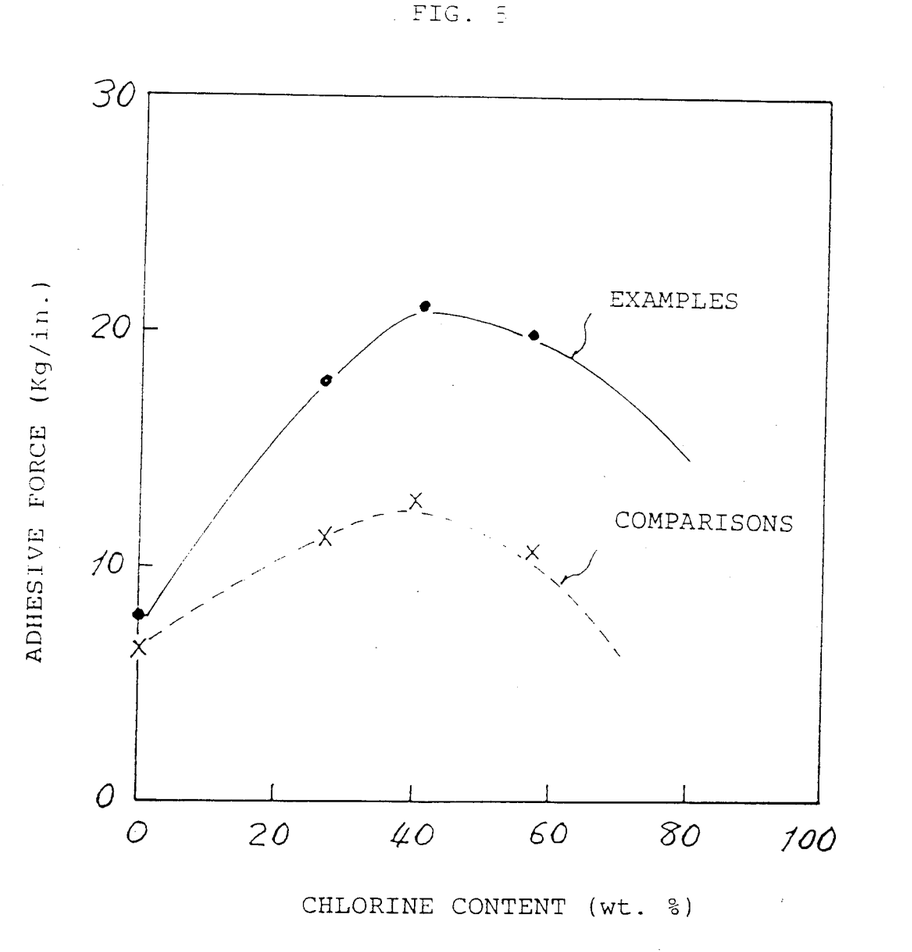

The fiber cords were then bonded to the same rubber mix as in the Example 1, and peeling adhesive force was measured in the same manner as in the Example 1. The results are shown in the Table 11 and in FIG. 5 which illustrates the relation between the chlorine content of the polymers in the adhesive compositions and the peeling adhesive force.

TABLE 11

| | Invention | | | Comparison | |
|---|---|---|---|---|---|
| | 1 | 2 | 3 | 1 | 2 |

TABLE 11-continued

| Solution in 1st step | A | A | A | A | A |
|---|---|---|---|---|---|
| Solution in 2nd step | H | H | H | H | H |
| Adhesive in 3rd step | W | X | Y | Z | — |
| Adhesive force (Kg/in.) | 19.6 | 20.8 | 18.4 | 7.4 | 3.8 |
| Strength (Kg/cord) | | | | | |
| Before flexing | 169 | 172 | 173 | 172 | 176 |
| After flexing | 135 | 147 | 155 | 152 | 162 |
| Strength retention (%) | 80 | 85 | 90 | 88 | 92 |

| | Comparison | | | |
|---|---|---|---|---|
| | 3 | 4 | 5 | 6 |
| Solution in 1st step | A | A | A | A |
| Solution in 2nd step | — | — | — | — |
| Adhesive in 3rd step | W | X | Y | Z |
| Adhesive force (Kg/in.) | 10.1 | 13.4 | 11.2 | 8.1 |
| Strength (Kg/cord) | | | | |
| Before flexing | 153 | 155 | 158 | 157 |
| After flexing | cut | cut | 28 | 36 |
| Strength retention (%) | 0 | 0 | 18 | 23 |

EXAMPLE 14

The same sheet of the rubber mix as in the Example 1 was rolled on a drum, and thereon the fiber cords which had been treated in the Example 12 were spun. Then, the same sheet of the rubber mix as above was further rolled on the fiber cords.

The layered sheets of the rubber mixes were then steam vulcanized in the same manner as in the Example 2. The resultant layered sheets having fiber cords embedded therein were subjected to the same flexing test as in the Example 2. The results are shown in the Table 11.

EXAMPLE 15

The same fiber cords as in the Example 1 were treated with adhesive compositions containing halogen containing polymers and polyepoxy compounds in varied ratios, and otherwise in the same manner as in the Run Invention No. 1 in the Example 13. Then, the cords were bonded to the same rubber mix as in the Examples 1 and 2, to provide adherends. The same measurements as in the Examples 1 and 2 were carried out.

Figure 6:
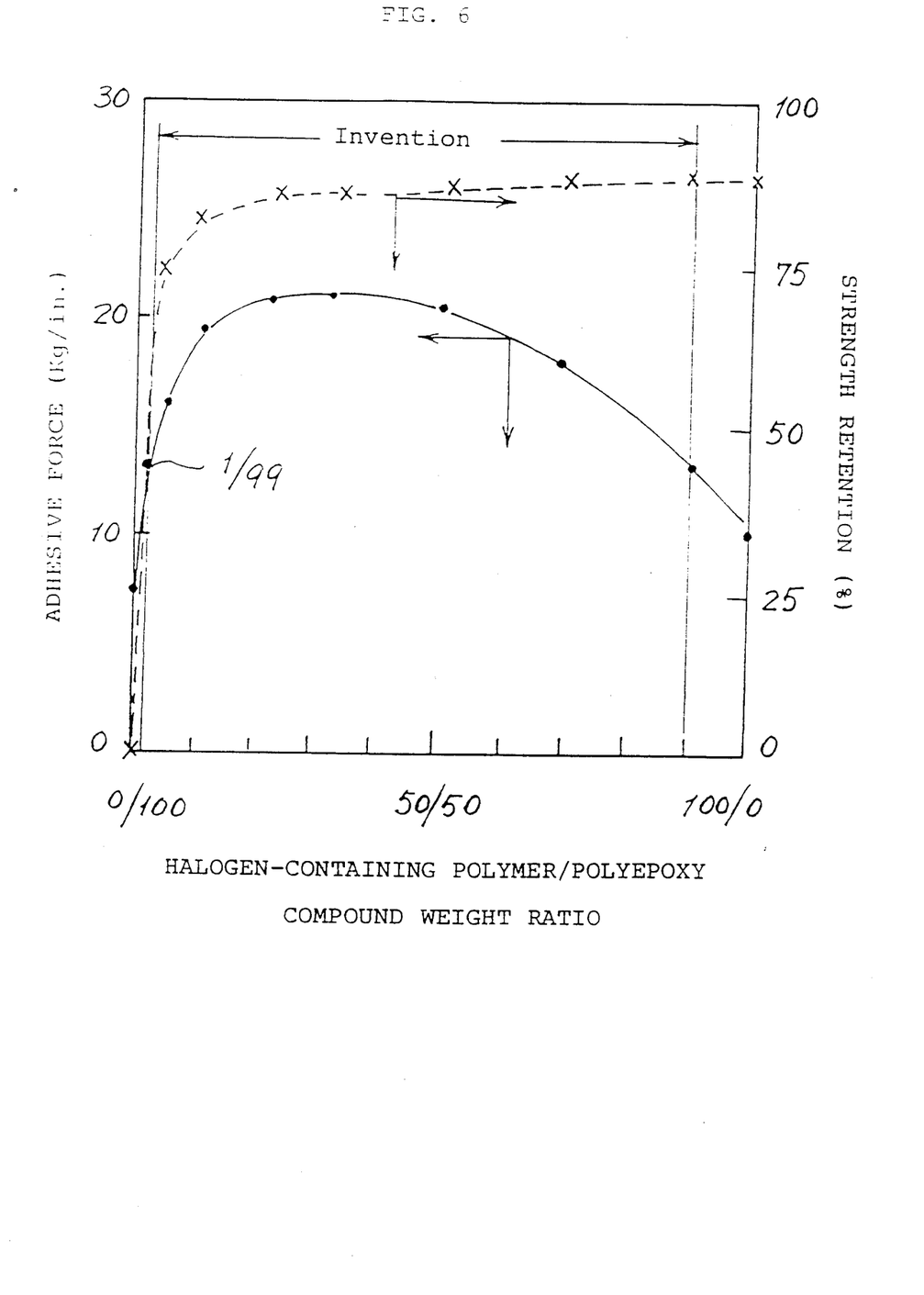

The results are shown in FIG. 6, which shows the relation between the weight ratio of chlorine-containing polymers to polyepoxy compounds in the adhesive compositions used, and adhesive force and strength retention of the resultant adherends of hydrogenated nitrile rubber and aromatic polyamide fiber cords.

EXAMPLE 16

The same fiber cords as in the Example 1 were treated with resorcinol/formalin/latex solutions I, J and K, respectively, shown in the Table 3, in place of the Solution A, and otherwise in the same manner as in the Run Invention No. 1 in the Example 13. Then, the cords were bonded to the same rubber mix as in the Examples 1 and 2, to provide adherends. The same measurements as in the Examples 1 and 2 were carried out. The results are shown in the Table 12.

TABLE 12

| | Example 16 Invention | | | Example 17 Invention | |
|---|---|---|---|---|---|
| | 4 | 5 | 6 | 7 | 8 |
| Solution in 1st step | A | A | A | B | C |
| Solution in 2nd step | I | J | K | H | H |
| Adhesive in 3rd step | W | W | W | W | W |
| Adhesive force (Kg/in.) | 19.7 | 18.4 | 23.3 | 18.3 | 18.1 |
| Strength retention (%) | 86 | 81 | 88 | 98 | 99 |

EXAMPLE 17

The same fiber cords as in the Example 1 were treated with the Solutions B and C, respectively, and otherwise in the same manner as in the Run Invention No. 1 in the Example 13. Then, the cords were bonded to the same rubber mix as in the Examples 1 and 2, to provide adherends. The same measurements as in the Examples 1 and 2 were carried out. The results are shown in the Table 12.

EXAMPLE 18

The fiber cords shown in the Table 13 were used in place of the aromatic polyamide fiber cords, and otherwise in the same manner as in the Run Invention No. 1 in the Example 13, the cords were bonded to the same sheet of the hydrogenated nitrile rubber mix as in the Examples 1 and 2.

The same measurements as in the Examples 1 and 2 were carried out. The results are shown in the Table 13.

TABLE 13

| | Invention | | |
|---|---|---|---|
| | 9 | 10 | 11 |
| Fiber cords[1] | a | b | c |
| Structures | 1200D/ | 1260D/ | 1100D/ |
| | 2 × 3 | 2 × 3 | 2 × 3 |
| Adhesive force (Kg/inch) | 20.3 | 19.4 | 18.4 |
| Strength retention (%) | 98 | 99 | 89 |

Notes:
a: of polyvinyl alcohol;
b: of aliphatic polyamide;
c: of polyester

What is claimed is:

1. A method of bonding fibers to hydrogenated nitrile rubber which comprises:
    the first step of treating fibers with an activating agent selected from the group consisting of polyisocyanates, epoxy compounds and silane coupling agents;
    the second step of dipping the fibers into a resorcinol/formalin/latex solution;
    the third step of treating the fibers with an adhesive composition which comprises (a) 1–90% by weight of polymers, based on the composition, the polymers containing halogens in amounts of 25–70% by weight based on the polymers, and (b) 10–99% by weight of polyisocyanates, aromatic polynitroso compounds or polyepoxy compounds; and
    the fourth step of placing the fibers in close contact with hydrogenated nitrile rubber and vulcanizing the rubber together with the fibers.

2. The method as claimed in claim 1 wherein the polymers are chlorinated rubber, polyvinyl chloride, chloroprene rubber or chlorosulfonated polyethylene rubber.

3. The method as claimed in claim 1 wherein the latices are acrylonitrile/butadiene rubber latices, carboxylated acrylonitrile/butadiene rubber latices, styrene/butadiene rubber latices, vinylpyridine rubber latices, chloroprene rubber latices or chlorosulfonated polyethylene rubber latices.

4. The method as claimed in claim 1 wherein the resorcinol/formalin/latex solution contains resorcinol and formalin in molar ratios of 1/3–3/1, and the latices and resorcinol/formalin in ratios of latices as solids to resorcinol/formalin in dry weights of 10/1–1/3.

5. The method as claimed in claim 1 wherein the hydrogenated nitrile rubber has a hydrogenation rate of 80–99%.

6. The method as claimed in claim 1 wherein the hydrogenated nitrile rubber is in the form of compounded mixes.

7. The method as claimed in claim 1 wherein the fibers are cotton, rayon, polyvinyl alcohol fibers, aromatic polyamide fibers, aliphatic polyamide fibers, polyester fibers, glass fibers or carbon fibers.

8. The method as claimed in claim 1 wherein the fibers are in the form of fiber cords.

* * * * *